United States Patent Office 3,433,181
Patented Mar. 18, 1969

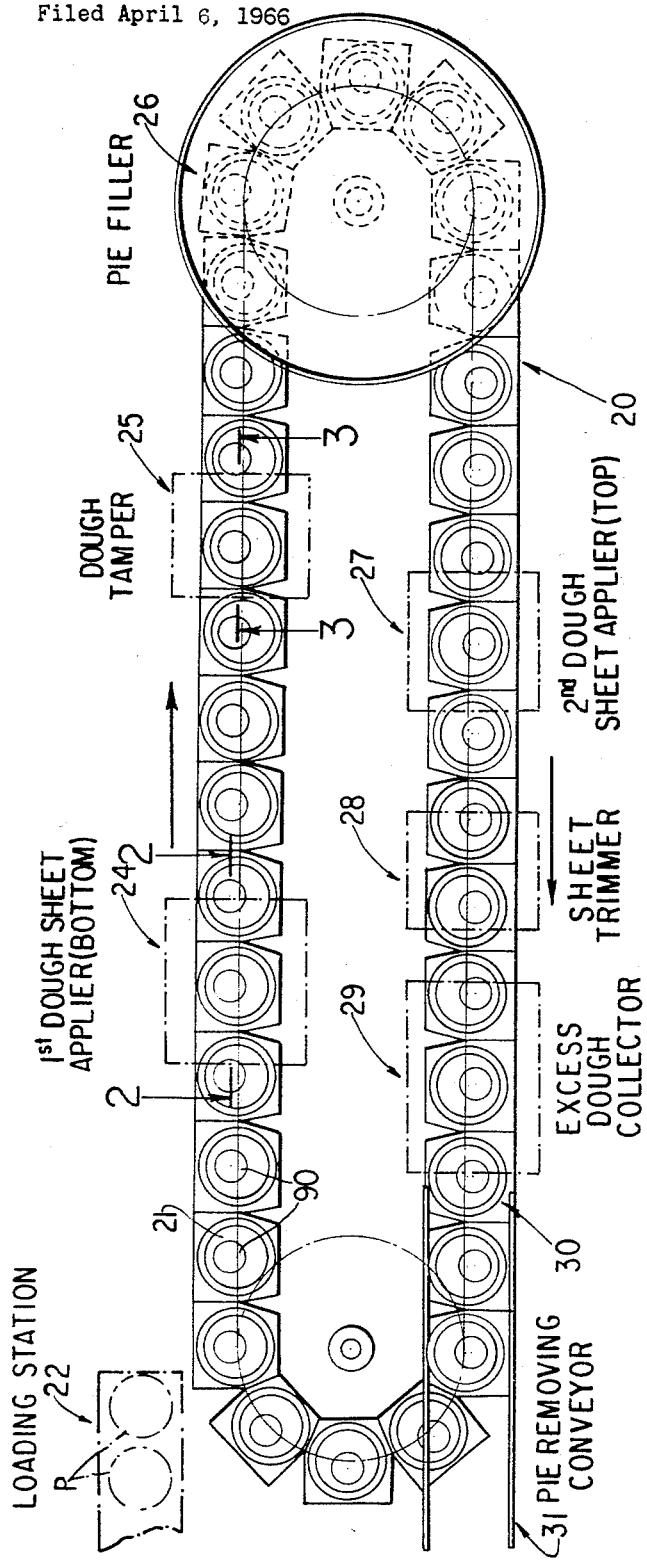
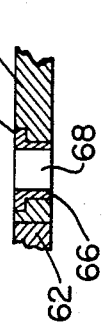

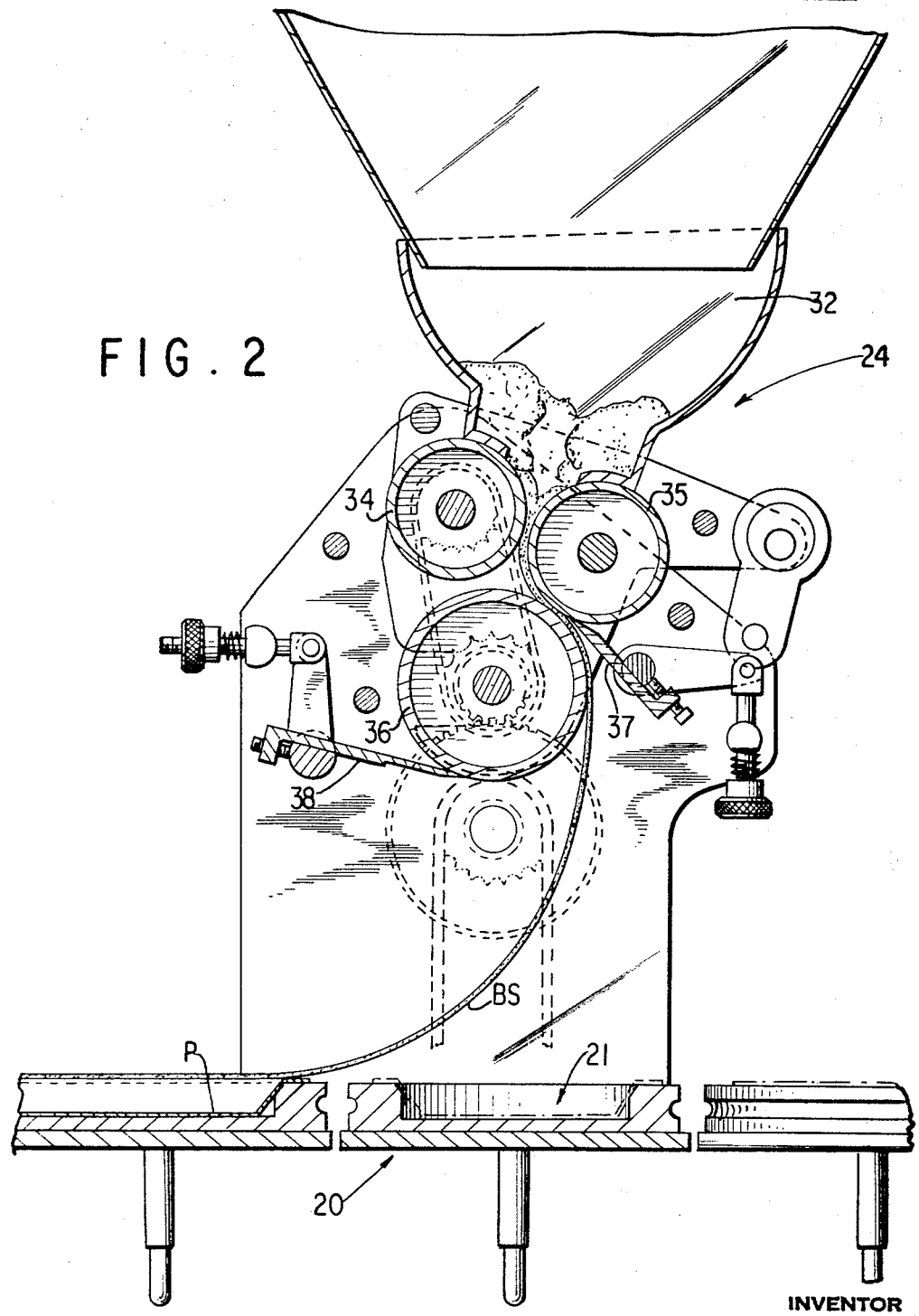

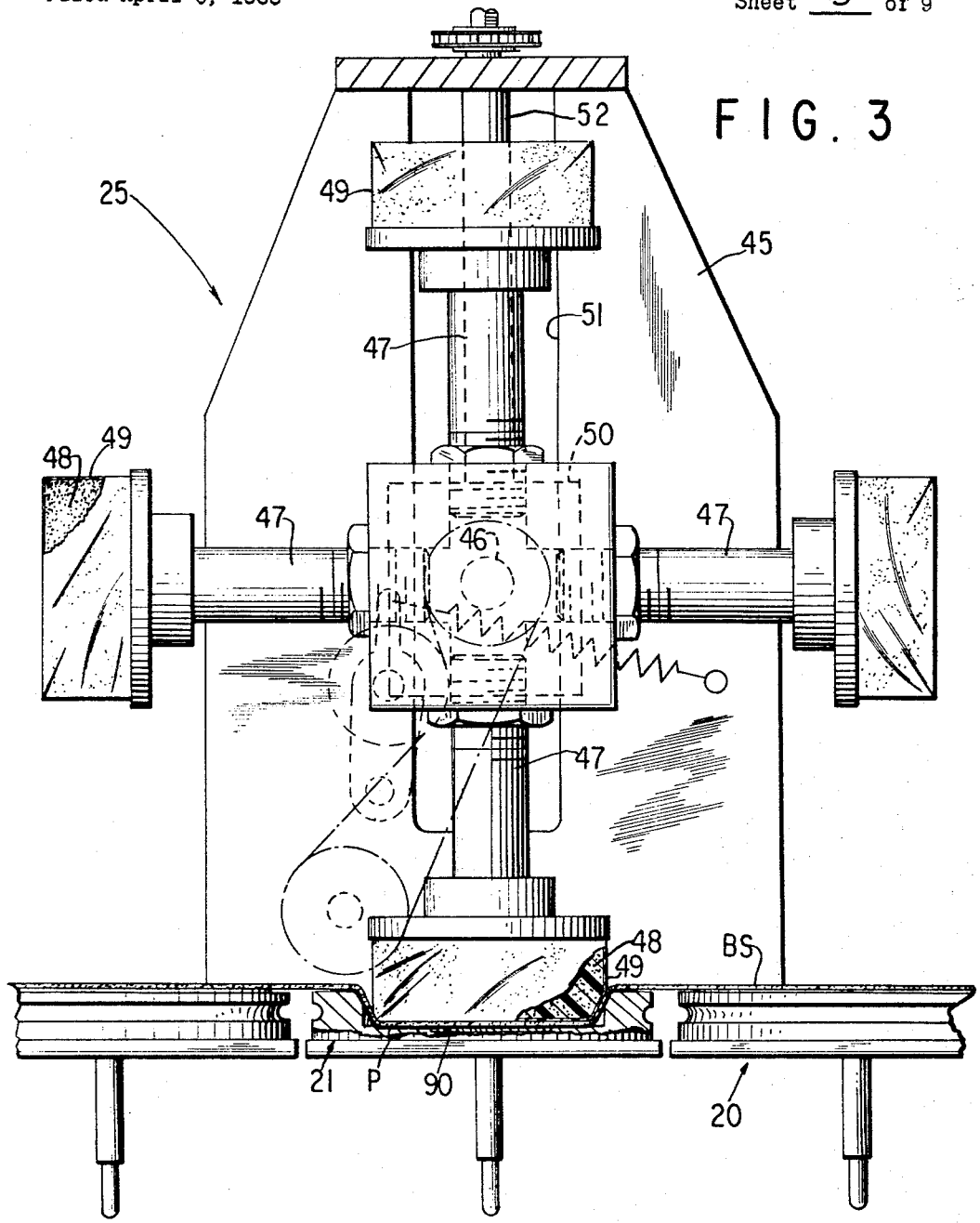

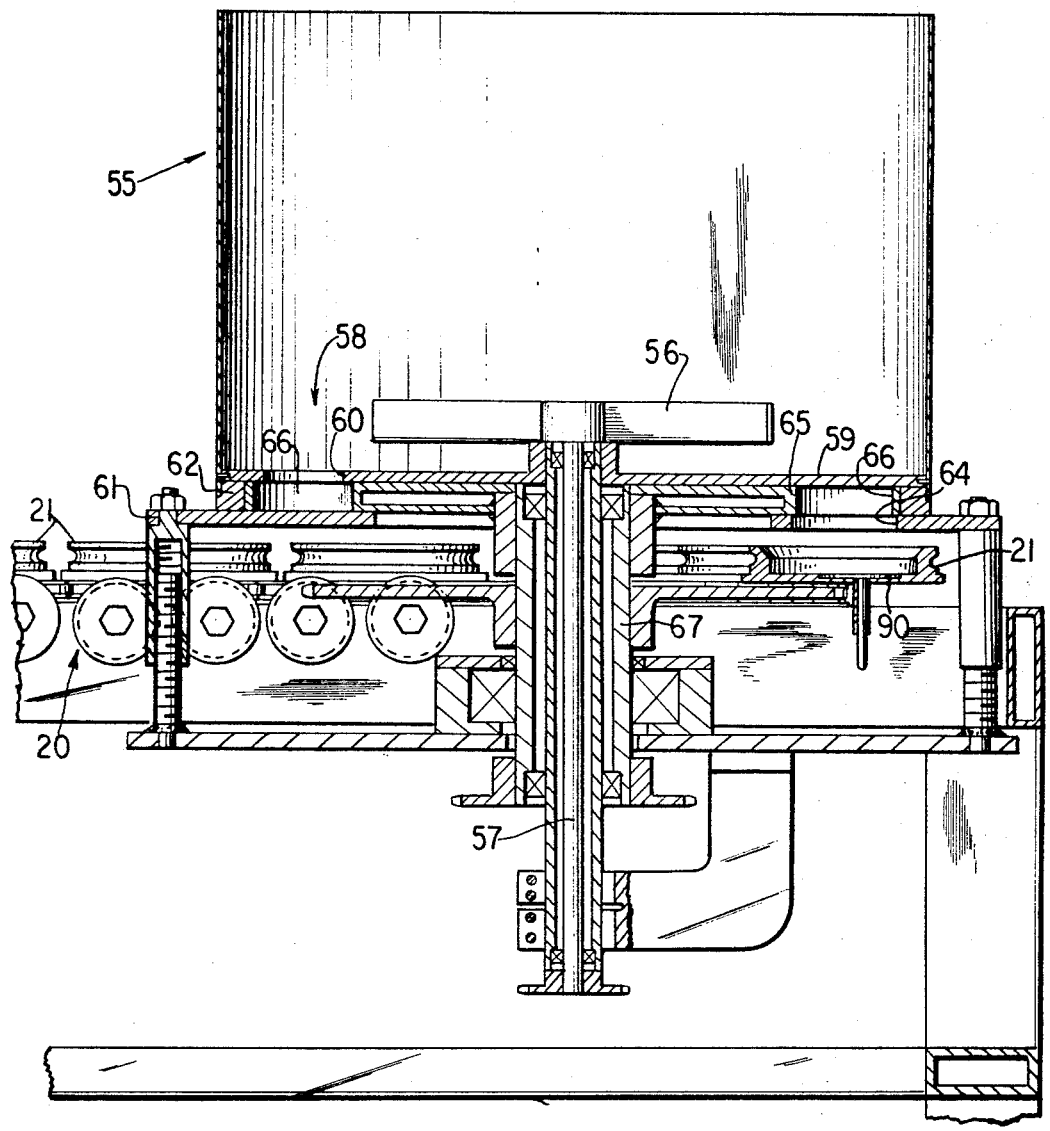

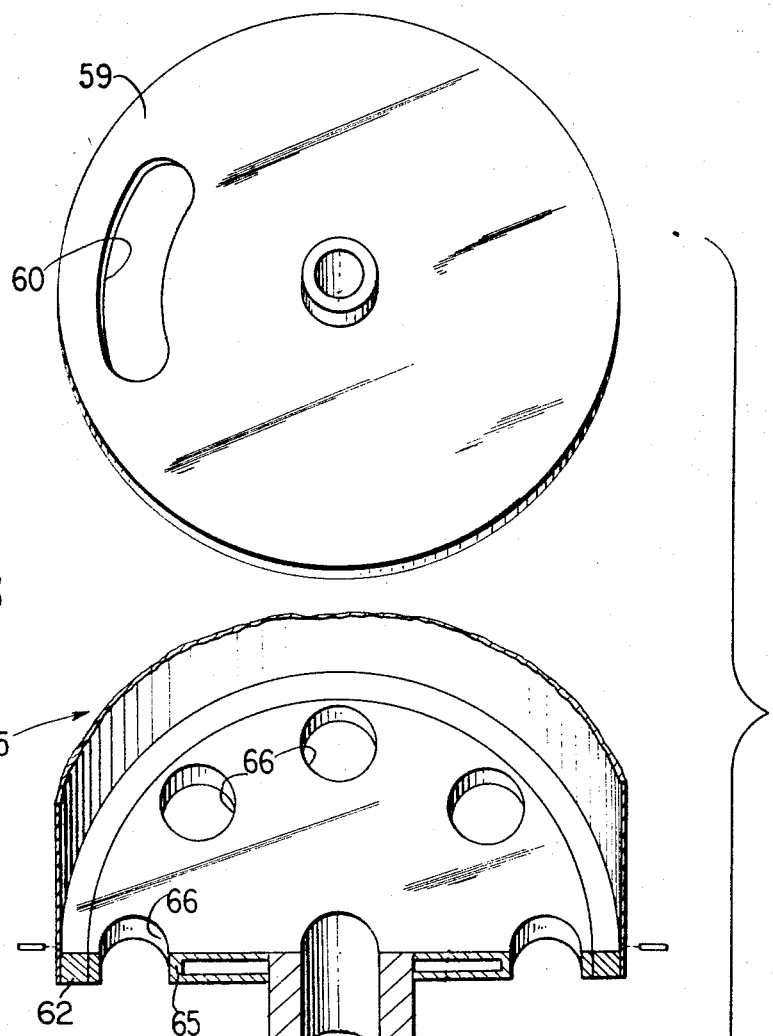

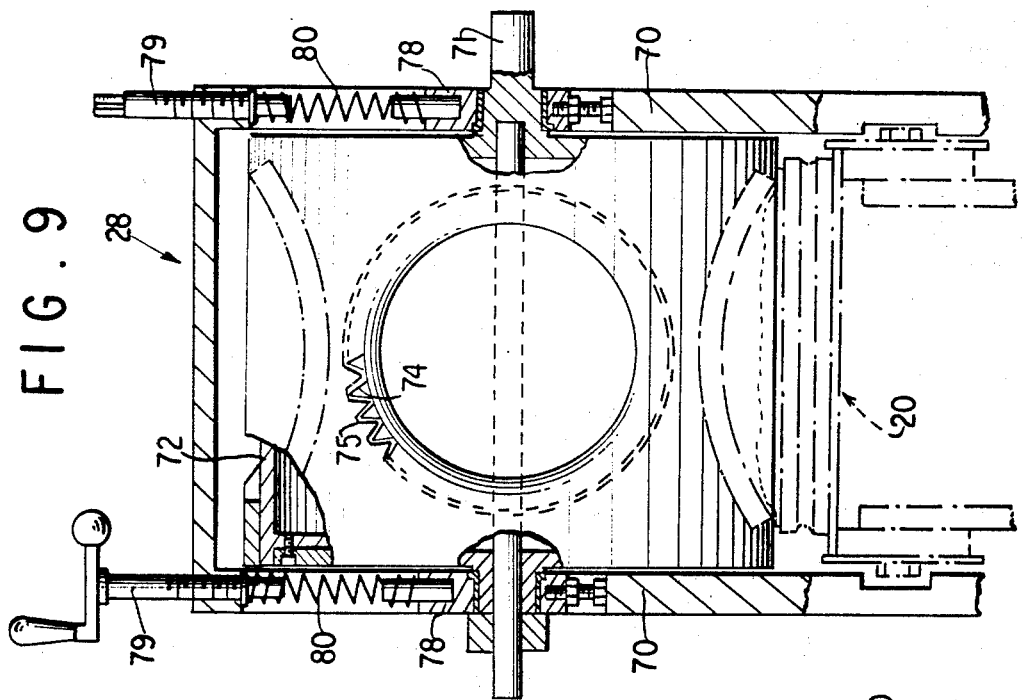
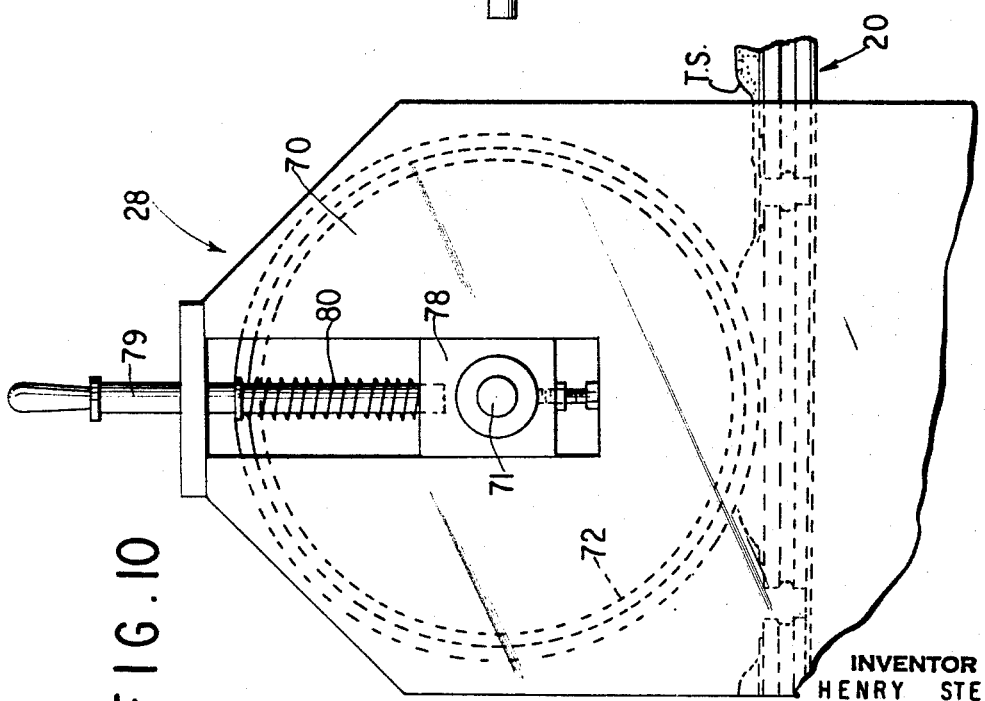

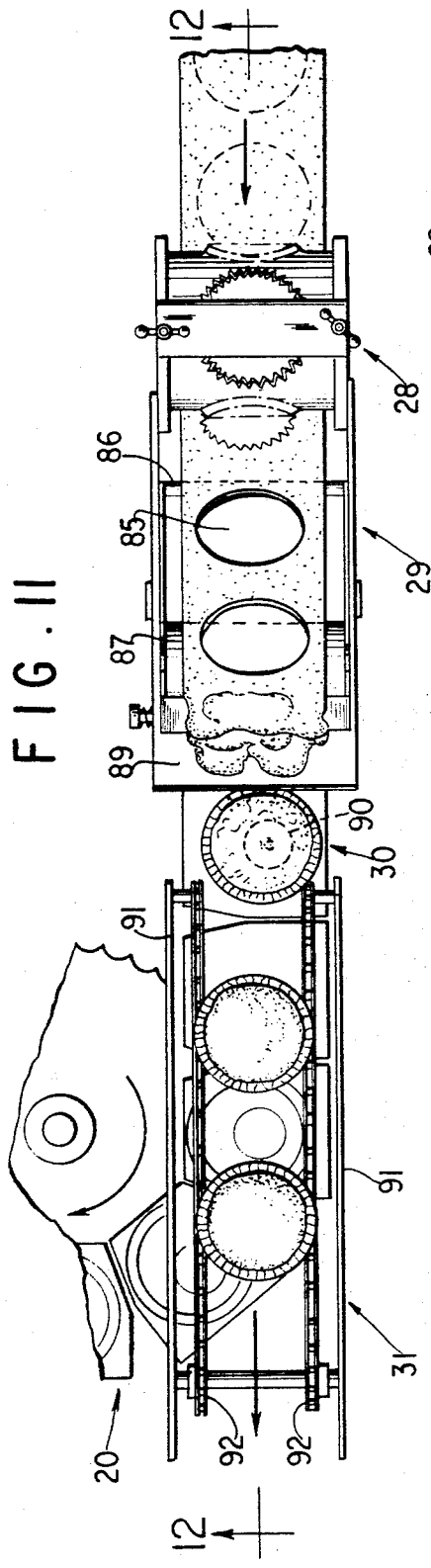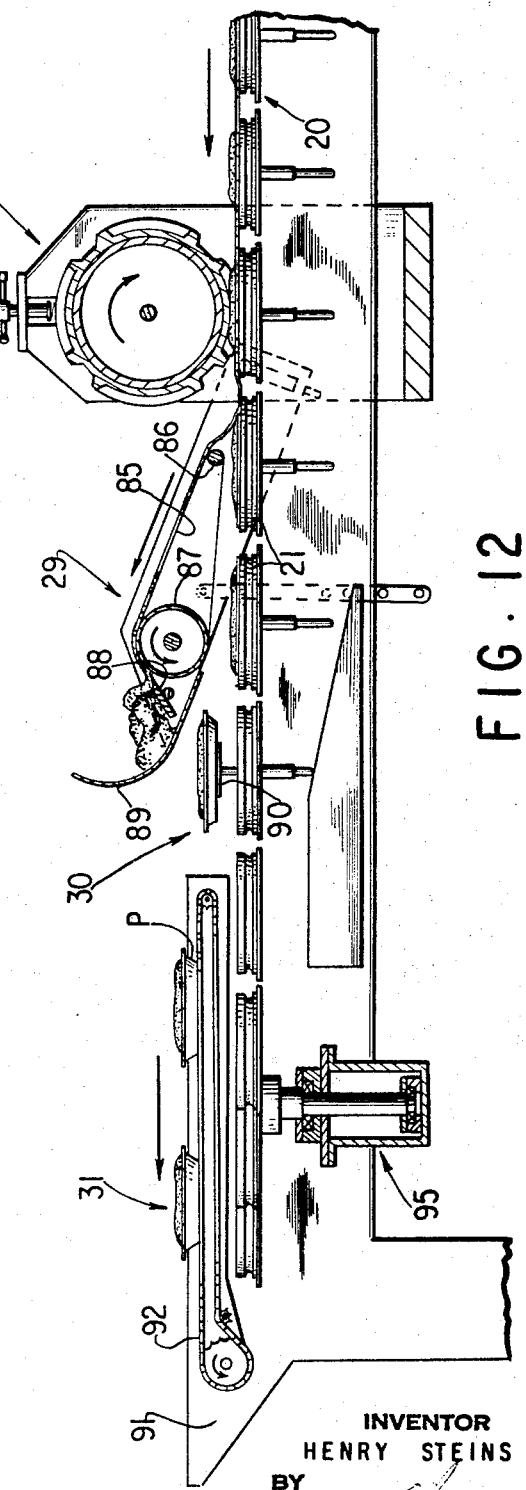

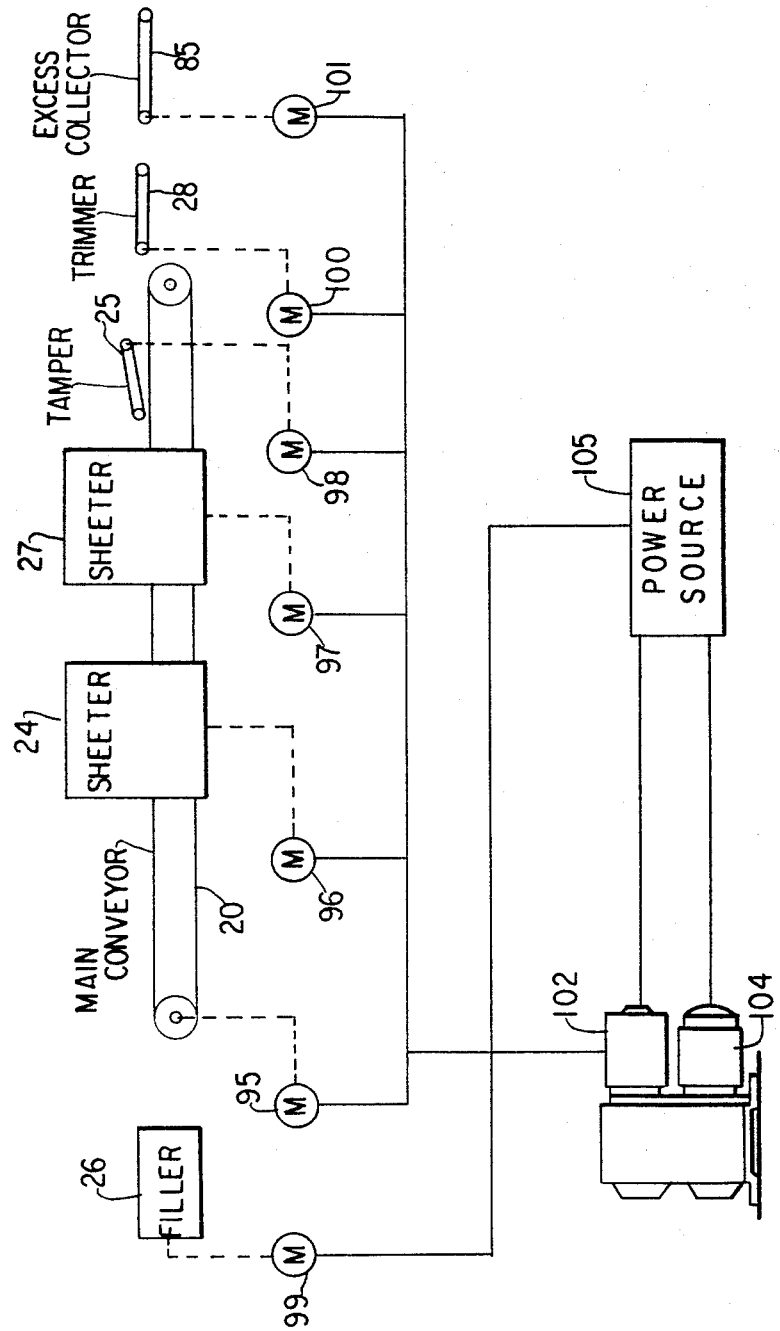

3,433,181
PIEMAKING MACHINE
Henry Steins, 217—85 28th Ave.,
Queens Village, N.Y. 11360
Filed Apr. 6, 1966, Ser. No. 545,200
U.S. Cl. 107—1                    12 Claims
Int. Cl. A23g 3/00

ABSTRACT OF THE DISCLOSURE

A high speed piemaking machine including a horizontal endless continuously moving conveyor having two lineally extending strands and two 180° turns; a bottom dough sheet applier and a sheet tamper in one of the strands; a top dough sheet applier, a dough sheet trimmer and a trimmings collector in the other strand; and a continuously rotating filling material measuring and feeding arrangement at one of the turns.

---

The present invention relates to automatic piemaking machines, and more particularly, to an improved machine of this type.

Heretofore, automatic piemaking machines have been devised which generally included an endless conveyor for carrying pie plates, a station at which the bottom dough was deposited in the pie plates, a station for filling the pie, a station at which the top dough was deposited for closed pies, a station at which the dough was crimped onto the pan and trimmed, and mechanism for removing the filled pies from the conveyor.

These prior machines had limitations as to speed of operation and flexibility of operation at various speeds, and involved problems of cleanliness, particularly with respect to the removal of dough trimmings and overall cleaning. In view of the forthcoming rigid sanitary regulations required for food handling machinery, these prior machines will become obsolete because of their inability to qualify and meet the proposed standards.

Accordingly, an object of the present invention is to provide an improved automatic piemaking machine which meets the most rigid sanitary standards and regulations.

Another object is to provide such a machine wherein the various stations and mechanisms are improved to work more efficiently and lend themselves to more thorough cleaning.

Another object is to provide such a machine which handles trimmings in a sanitary manner so that the trimmings can be reused.

Another object is to provide such a machine wherein the flouring of the dough is eliminated but yet the dough will not adhere to parts of the machine.

Another object is to provide such a machine which can be operated at higher speeds with less manual supervision whereby production is increased and labor costs are reduced.

Another object is to provide such a machine wherein the various stations and mechanisms are synchronized for operation at different speeds depending upon the nature of the filling for the pies.

Another object is to provide such a machine which can handle fillings including fruits, custards, vegetables, meats, fish and/or fowl of any kind and of any consistency.

A further object is to provide such a machine which is economical in construction and is reliable in operation.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by providing an improved machine wherein a continuous sheet of dough is laid across a pie plate, and is gently tamped to place a portion thereof into the plate, the pie is filled, a second continuous sheet of dough is laid across the pie plate if a closed pie is desired, the sheet or sheets are trimmed and are crimped onto the pie plate, and the stamped out trimmings are collected in sheet form for reuse as clean dough.

A preferred embodiment of the invention has been chosen for purposes of illustration and description, and is shown in the accompanying drawings, forming a part of the specification, wherein:

FIG. 1 is a schematic plan view of a machine in accordance with the present invention.

FIG. 2 is an enlarged vertical sectional view of a dough sheet feeder taken along the line 2—2 on FIG. 1.

FIG. 3 is an enlarged vertical sectional view of a mechanism for tamping the bottom dough sheet into the pie plates taken along the line 3—3 on FIG. 1.

FIG. 4 is an enlarged vertical sectional view of the filling station taken along the line 4—4 on FIG. 1.

FIG. 4A is a fragmentary sectional view illustrating a removable insert for varying the volume of pie filling to be delivered.

FIG. 8 is an exploded view illustrating further details of the filling station.

FIG. 9 is an elevational view of the dough sheet trimmer.

FIG. 10 is a sectional view of the dough sheet trimmer taken along the line 10—10 on FIG. 9.

FIG. 11 is a plan view of the dough sheet trimming and collecting mechanism, and the mechanism for removing the pies from the machine.

FIG. 12 is a sectional view taken along the line 12—12 on FIG. 11.

FIG. 13 is a simplified wiring diagram of the arrangement for maintaining the various drives synchronized while operating at different production speeds.

General description

Figure 5:
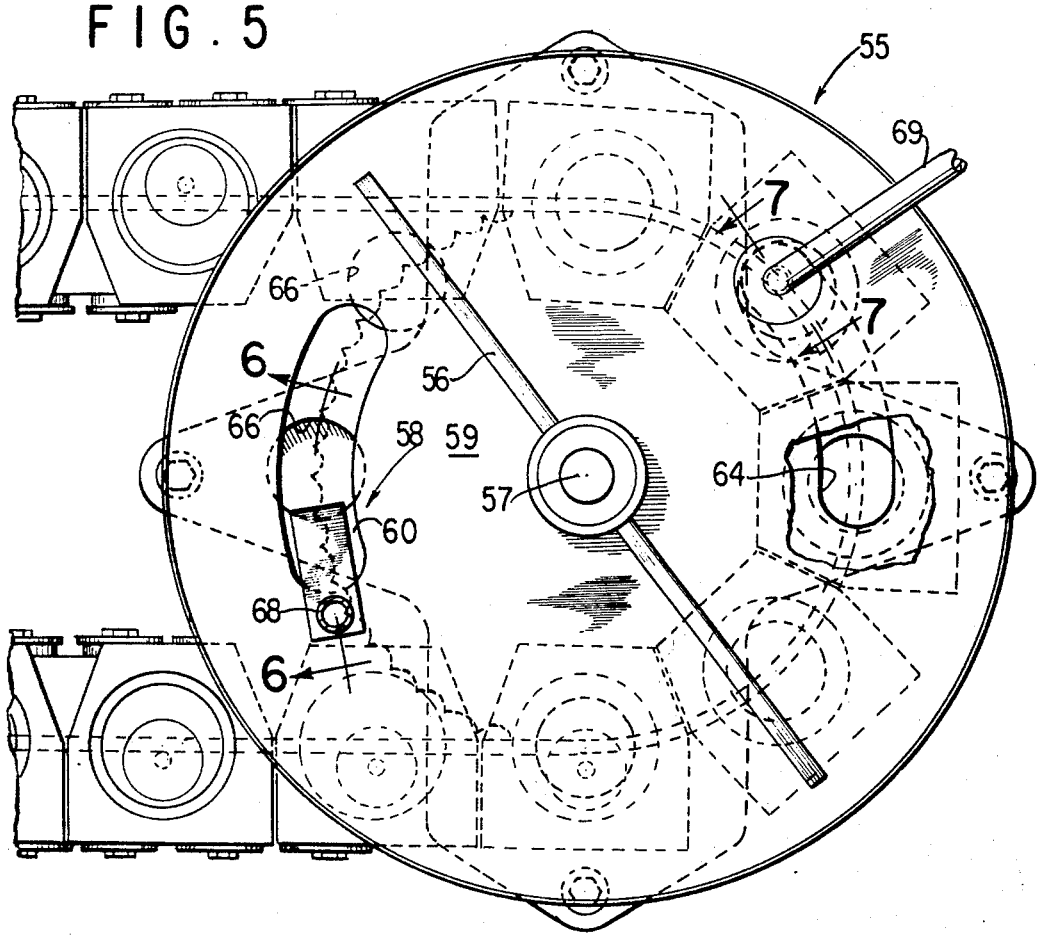
FIG. 5 is a sectional view taken along the line 5—5 on FIG. 4 illustrating details of the filling station.

Referring now in detail to FIG. 1 of the drawings, there is shown an automatic piemaking machine which comprises a horizontal endless conveyor 20 having pie plate receiving stations 21 thereon and being arranged in two parallel strands; a station 22 at which the pie plates P are placed on the conveyor; a first feeder or dough sheet forming and laying means 24 for depositing a continuous sheet of dough BS across the pie plates; a device 25 for gently tamping the dough sheet to place portions thereof into the bottom of the pie plates to provide the bottom dough sheet; a piefilling station 26 at the bend where the conveyor strands are joined by a half circle conveyor section; a second feeder or dough sheet forming and laying means 27 which is identical to the first means 24 and is used only for depositing a continuous sheet of dough TS for providing a top dough sheet for closed pies but which is not used when making open pies; a dough sheet trimmer 28 for trimming away the portions of the dough sheet or sheets extending beyond the pie plates and for crimping the edges of the trimmed dough sheet or sheets onto the rim of the pie plates; an arrangement 29 for collecting the dough sheet trimmings which is conveniently located so that the trimmings can be returned to either of the sheeting means 24 or 27 as is desired; and a mechanism 30 for elevating the pies on the conveyor 20 and placing them on a take-away conveyor 31.

The conveyors 20 and 31 move continuously and the various means, mechanism and devices associated with the conveyor 20 likewise are operated continuously in synchronism with each other and the conveyors at various desired speeds.

*The dough sheet feeders*

Since the dough sheet forming and laying means 24 and 27 are identical only one of them will be described in detail.

As shown in FIG. 2, the feeder 24 comprises a hopper 32 in which a mass of dough is placed and to which the trimmings are returned, kneading rolls 34 and 35, and a roll 36 cooperating with the roll 35 to form the dough sheet BS. Doctor blades 37 and 38 clean the rolls 35 and 36, respectively.

*The tamping device*

The bottom dough sheet tamping device 25 shown in FIG. 3 comprises a pair of side frames 45 which straddle the conveyor 20 at a point just downstream of the first sheet feeder 24, a shaft 46 rotatably mounted between the frames 45 and driven continuously, a plurality of evenly circumferentially spaced radially extending arms 47 on the shaft 46, for example four as shown, and a head 48 at the outer end of each arm shaped to fit the bottom of the pie plates and to depress dough sheet portions and lay them on the bottom of the pie plates with an annular side portion of the dough sheet fitting against the side wall of the pie plates.

Preferably, the heads 48 are formed of a relatively soft yieldable material such as foamed plastic which will not tear the dough sheet while depressing portions thereof, and the heads are each provided with a disposable sanitary plastic film cover 49. At the end of a piemaking production run, the covers are removed from the heads and are replaced when the machine is about to be started again for the next run, whereby the cleanliness of the heads is assured at all times.

The downward extent to which the dough sheet portions are depressed can be accurately adjusted by mounting the shaft 46 between bearing slides 50 which are supported on the side frames 45 in a runway 51 for upward and downward movement and are moved into and clamped in their adjusted position by screws 52 or the like.

*The filling station*

Figure 6:
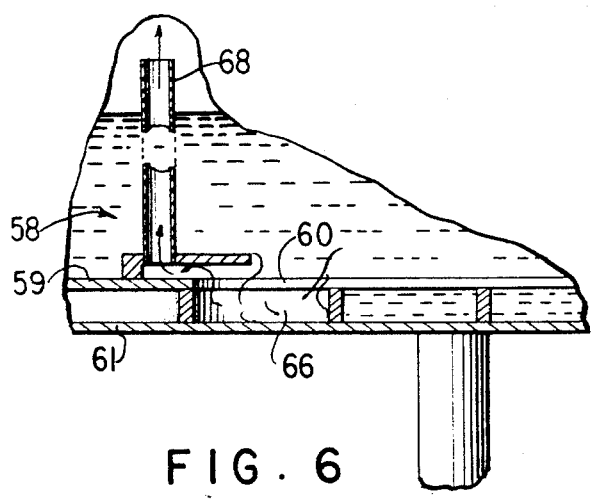
FIG. 6 is a sectional view taken along the line 6—6 on FIG. 5 illustrating another detail of the filling station.
Figure 7:
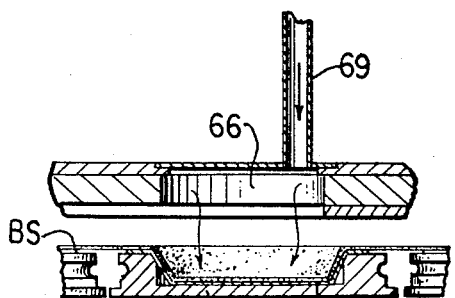
FIG. 7 is a sectional view taken along the line 7—7 on FIG. 5 illustrating still another detail of the filling station.

The filling station shown in FIGS. 4, 5, 6, 7 and 8 includes an upright cylindrical tank 55 centrally disposed with respect to the drive which brings the conveyor 20 around the half circle turn between the conveyor strands and extending across the pie plates passing through the half circle turn of the conveyor, the tank containing the filling material for the pies; an agitator 56 in the tank mounted on a rotating shaft 57 driven at a desired speed to uniformly distribute the pie filling material without comminuting the same; and a pie material batch measuring and feeding arrangement 58 at the bottom of the tank about to be described in detail.

The measuring and feeding arrangement 58 includes a bottom 59 for the tank 55 having an arcuate pie filling material supply slot 60 therein; a pie filling material feeding plate 61 spaced downwardly of the tank bottom 59 by a ring 62 and having an arcuate slot 64; a rotating batch measuring disc 65 between the tank bottom and the feeding plate 61 having a plurality of circular cavities 66 therein which are circumferentially spaced apart the same distance as the stations 21 and are adapted to register with the slot 60 and the slot 64; and a shaft 67 for rotating the disc 65 which is driven by and at the same speed as the conveyor 20 so that a batch of pie filling material is deposited through the slot 64 each time a pie plate appears under it.

The area of the cavities 66 and the thickness of the disc 65 are dimensioned to measure the batch, and the slot 64 and the cavities 66 are dimensioned to drop the batches into the depressed bottom dough sheet portions in a uniformly distributed manner.

In order to assure that the batches drop into the cavities 66 without delay, a pipe 68 extends from the slot 60 to the upper end of the tank 55 to relieve any suction effect on the batches working against gravity. Also, a pipe 69 supplied with air under pressure is positioned above the cavities 66 to force the batches of filling material into the dough sheet tamped with the pie plates P. Thus, in operation of the filling station, the filling material drops through the slot 60 into the cavities 66 to measure the batches and the batches drop through the slot 64 into the pie plates on top of the bottom sheet BS.

In FIG. 4A, there is shown an insert 63 removably mounted in a cavity 66 and having a bore 68 which determines the volume of the filling material to be delivered to the pies.

*Dough sheet trimmer*

The dough sheet trimmer 28 is down stream of the top dough sheet feeder 27 which is between the filler 26 and the trimmer 28.

As shown in FIGS. 9 and 10, the dough sheet trimmer 28 comprises a pair of side frames 70 which straddle the conveyor 20, a shaft 71 rotatably mounted between the frames 70 and driven continuously, and a drum 72 mounted on and rotated by the shaft and having generally circular cutting and crimping die surfaces 74 and 75 thereon which, when developed in a horizontal plane such as that through which the dough sheet edges pass, are effective to trim and crimp the dough sheets onto the pie plates in a manner to leave cut out dough trimmings in sheet form.

The drum 72 also may be provided with interchangeably mounted cutting elements for marking top dough sheet of the pies so as to indicate the kind of filling in the pies, and with cutting elements for forming vents in the top dough sheet. The drum is heated electrically to prevent the dough from sticking thereto.

The downward extent or the plane in which the drum surfaces and elements function is accurately adjusted by mounting the shaft 71 on bearing slides 78 which are supported on the frames 70 for upward and downward movement and are moved into and clamped in their adjusted position by screws 79 or the like. The drum 72 floats on springs 80 which allow the drum to adjust itself to accommodate pies of a slightly greater height than planned.

*The sheet trimmings collector and take-away conveyor*

As shown in FIGS. 11 and 12, the sheet trimmings collector 29 comprises a belt 85 mounted on an idler roll 86 adjacent the dough sheet trimmer 28 and a drive roll 87, a doctor blade 88 extending across the width of the belt 85 for scraping the trimmings therefrom and a trough 89 adjacent the doctor blade for collecting the trimmings. The upstream end of the belt 85 is positioned so that the sheet trimmings are deposited on the belt and are conveyed to the doctor blade for collection by the trough.

The collector is inclined upwardly in the downstream direction to provide a space beneath its downstream end so that the pies can be elevated by a platform 90 provided with a stem and associated with the stations 21 of the conveyor 20 which platform is moved upwardly by suitable cam mechanism 30 engaged by the stems as the pies approach the upstream end of the take-away-conveyor 31.

The take-away-conveyor 31 comprises a pair of horizontal parallel spaced apart angle members 91 in longitudinal alignment with the conveyor strand, and a conveyor chain 92 running across the horizontal section of each angle member on which rest diametrically opposite peripheral portions of the pie plates whereby the pies are carried away from the conveyor 20.

As the stations 21 of the conveyor 20 pass under the take-away-conveyor 31, the platforms 90 are lowered to their normal pie plate receiving position.

The drive synchronizer

In FIG. 13, a simplified wiring diagram is shown of an arrangement for maintaining the various drives in synchronism while the machine is being operated at different production speeds.

The conveyor 20, the dough sheet feeders 24 and 27, the tampering device 25, the filler 26, the sheet trimmer 28, and the trimmings collector belt 85 are each driven by separate motors 95, 96, 97, 98, 99, 100 and 101, respectively.

These motors are A.C. induction motors which are driven at variable speeds by varying the frequency of the power supply. This is accomplished by driving an alternator 102 with a variable speed motor 104 from a fixed frequency power source 105. Thus, as the speed at which the alternator 102 is driven is changed, the frequency of its output power supplied to the motors 95 to 101 is changed whereby the speeds at which these motors are driven are proportionally varied to maintain all the operations in synchronism.

An advantage of such a controlled speed drive arrangement is that the machine can be started slowly and can be thereafter operated over a wide range of speeds. For example, the machine can be operated to produce between twenty and eighty pies a minute, the operating speed being dictated by the type of pie filling material to be handled.

Operation and maintenance

The operation of the machine will be understood from the foregoing description and need not be repeated.

An important advantage is that after each run of the machine the dough sheet feeders 24 and 27, the filler 26, the sheet trimmer 28, the collector belt 85, the trough 89 and the doctor blade 88 can be dismantled for thorough cleaning of all the parts which come in contact with the dough. Such parts are constructed of corrosion resistant metallic alloys or other materials which can be maintained in a sanitary condition. Also, as already indicated, the covers 49 for the tamping heads 48 are disposed of and are replaced after each run.

Another important advantage is that the sheet trimmings are handled in a sanitary manner whereby they can be reused over and over and the cost of waste dough is eliminated.

Summation

From the foregoing description, it will be seen that the present invention provides an improved piemaking machine which is sanitary, economical in operation, highly productive and capable of handling all kinds of fillings, and can be operated at various production speeds which may be dictated by the materials being handled.

I claim:

1. In a piemaking machine, the combination of an endless continuously moving conveyor traveling at all times in a substantially horizontal plane and arranged to provide first and second lineally extending strands and two 180° turns, pie plate receiving stations on said conveyor maintained at all times in upright position, means in said first strand for laying a continuous sheet of dough across pie plates with the edges of the dough sheet extending substantially outwardly beyond the periphery of the pie plates, means in said first strand for depressing a portion of the dough sheet into each of the pie plates, means in said turn following said dough sheet depression means for filling the depressed portions of the dough sheet with a material providing the filling of the pies while the pie plates are in said turn, means in said second strand for the trimming away of the portions of the dough sheet extending outwardly beyond the pie plates and for crimping the edges of the trimmed dough sheet onto the pie plates to provide dough trimmings in continuous sheet form, and means immediately following said last mentioned means for collecting the dough sheet trimmings for reuse, said means for depressing dough sheet portions including rotary device having a plurality of radially extending circumferentially spaced arms provided with heads at the free end thereof formed of yieldable material.

2. In a piemaking machine according to claim 1, wherein said heads have sanitary disposable covers thereon.

3. In a piemaking machine, the combination of an endless continuously moving conveyor traveling at all times in a substantially horizontal plane and arranged to provide first and second lineally extending strands and two 180° turns, pie plate receiving stations on said conveyor maintained at all times in upright position, means in said first strand for laying a continuous sheet of dough across pie plates with the edges of the dough sheet extending substantially outwardly beyond the periphery of the pie plates, means in said first strand for depressing a portion of the dough sheet into each of the pie plates, means in said turn following said dough sheet depression means for filling the depressed portions of the dough sheet with a material providing the filling of the pies while the pie plates are in said turn, means in said second strand for the trimming away of the portions of the dough sheet extending outwardly beyond the pie plates and for crimping the edges of the trimmed dough sheet onto the pie plates to provide dough trimmings in continuous sheet form, and means immediately following said last mentioned means for collecting the dough sheet trimmings for reuse, said filling means including a receptacle for the pie filling material having a bottom which comprises spaced apart upper and lower plates each having an arcuate slot therein spaced circumferentially apart from each other, and a continuously rotating intermediate plate having a plurality of circumferentially spaced apart openings therein providing cavities dimensioned to measure the amount of filling material for each pie and being arranged so that each of said openings receives a charge of the pie filling material through the slot in said upper plate and delivers the charge to the slot of said lower plate for delivery to the depressed dough sheet portion in the pie plate.

4. In a piemaking machine according to claim 3 wherein said openings in said intermediate plate are provided by removable inserts of various volumes to determine the quantity of pie filling delivered to the pies.

5. A piemaking machine according to claim 3, including a first pipe extending from the slot in said upper plate to atmosphere to relieve any suction effect on the batches working against gravity flow, and a second pipe for supplying air under pressure positioned above the cavity in registry with the slot of said lower plate to force the batches into the depressed portions of the dough sheet.

6. A piemaking machine according to claim 5, wherein said first pipe is adjacent the end of the slot in said upper plate where the cavities begin to register therewith, and said second pipe is within the end of the slot in said lower plate where the cavities first come in registry therewith.

7. In a piemaking machine, the combination of an endless continuously moving conveyor traveling at all times in a substantially horizontal plane and arranged to provide first and second lineally extending strands and two 180° turns, pie plate receiving stations on said conveyor maintained at all times in upright position, means in said first strand for laying a continuous sheet of dough across pie plates with the edges of the dough sheet extending substantially outwardly beyond the periphery of the pie plates, means in said first strand for depressing a portion of the dough sheet into each of the pie plates, means in said turn following said dough sheet depression means for filling the depressed portions of the dough sheet with a material providing the filling of the pies while the pie plates are in said turn, means in said second strand for the trimming away of the portions of the dough sheet extending outwardly beyond the pie plates and for crimping the edges of the trimmed dough sheet onto the pie plates to provide dough trimmings in continuous sheet form, and means immediately following said last mentioned means for collecting the dough sheet trimmings for reuse, said dough sheet trimmings collector means including a belt conveyor entirely above the filled and trimmed pies having an upper horizontal strand arranged to lay thereon the dough sheet trimmings at one end thereof, and a receptacle above the filled pies at the other end of said belt conveyor arranged for receiving the dough sheet trimmings.

8. In a piemaking machine according to claim 7, including a doctor blade at the receptacle end of said upper strand for scraping the dough sheet trimmings therefrom.

9. In a piemaking machine, the combination of an endless continuously moving conveyor traveling at all times in a substantially horizontal plane and arranged to provide first and second lineally extending strands and two 180° turns, pie plate receiving stations on said conveyor maintained at all times in upright position, means in said first strand for laying a continuous sheet of dough across pie plates with edges of the dough sheet extending substantially outwardly beyond the periphery of the pie plates, means in said first strand for depressing a portion of the dough sheet into each of the pie plates, means in said turn following said dough sheet depression means for filling the depressed portions of the dough sheet with a material providing the filling of the pies while the pie plates are in said turn, means in said said second strand for the trimming away of the portions of the dough sheet extending outwardly beyond the pie plates and for crimping the edges of the trimmed dough sheet onto the pie plates to provide dough trimmings in continuous sheet form, and means immediately following said last mentioned means for collecting the dough sheet trimmings for reuse, and pie take-off means comprising a runway downstream of said trimming means above and in lengthwise alignment with a section of said conveyor, said runway having an entrance provided with means for placing the filled pie plates onto said runway, and conveyor means in said runway for moving the filled pie plates therethrough and discharging the same therefrom.

10. In a piemaking machine, the combination of an endless continuously moving conveyor traveling at all times in a substantially horizontal plane and arranged to provide first and second lineally extending strands and two 180° turns, pie plate receiving stations on said conveyor maintained at all times in upright position, means in said first strand for laying a continuous sheet of dough across pie plates with the edges of the dough sheet extending substantially outwardly beyond the periphery of the pie plates, means in said first strand for depressing a portion of the dough sheet into each of the pie plates, means in said turn following said dough sheet depression means for filling the depressed portions of the dough sheet with a material providing the filling of the pies while the pie plates are in said turn, means in said second strand for the trimming away of the portions of the dough sheet extending outwardly beyond the pie plates and for crimping the edges of the trimmed dough sheet onto the pie plates to provide dough trimmings in continuous sheet form, and means immediately following said last mentioned means for collecting the dough sheet trimmings for reuse, and independent motor means for said conveyor, said pie plate placing means, said dough sheet laying means, said dough sheet depressing means, said pie filling means, said trimming and crimping means and said trimmings collector means; and control means for operating said motor means in synchronism throughout a range of speeds.

11. In a piemaking machine, the combination of an endless continuously moving conveyor traveling at all times in a substantially horizontal plane and arranged to provide first and second lineally extending strands and two 180° turns, pie plate receiving stations on said conveyor maintained at all times in upright position, means in said first strand for laying a continuous sheet of dough across pie plates with the edges of the dough sheet extending substantially outwardly beyond the periphery of the pie plates, means in said first strand for depressing a portion of the dough sheet into each of the pie plates, means in said turn following said dough sheet depression means for filling the depressed portions of the dough sheet with a material providing the filling of the pies while the pie plates are in said turn, means in said second strand for the trimming away of the portions of the dough sheet extending outwardly beyond the pie plates and for crimping the edges of the trimmed dough sheet onto the pie plates to provide dough trimmings in continuous sheet form, and means immediately following said last mentioned means for collecting the dough sheet trimmings for reuse, said means for depressing dough sheet portions including a rotary device having a plurality of radially extending circumferentially spaced heads, and said heads having sanitary disposable covers thereon.

12. A piemaking machine according to claim 9, wherein means for laying a second continuous sheet of dough across the filled depressions of the first dough sheet is located between said filling means and said trimming and crimping means, said trimming and crimping means is arranged to simultaneously trim and crimp both of the dough sheets onto the pie plate and said collecting means handles the trimmings of both sheets in sheet form, with the second sheet on top of the first sheet.

References Cited

UNITED STATES PATENTS

| | | |
|---|---|---|
| 1,725,835 | 8/1929 | Smith. |
| 3,136,268 | 6/1964 | Gageant. |
| 821,784 | 5/1906 | Colborne. |
| 1,595,427 | 8/1926 | Smith. |
| 1,950,495 | 3/1934 | Kohler. |

FOREIGN PATENTS

| | | |
|---|---|---|
| 906,940 | 9/1962 | Great Britain. |
| 920,669 | 3/1963 | Great Britain. |
| 937,992 | 9/1963 | Great Britain. |

WALTER A. SCHEEL, *Primary Examiner.*

JOSEPH SHEA, *Assistant Examiner.*

U.S. Cl. X.R.

107—15, 69; 141—129